UNITED STATES PATENT OFFICE 2,531,365

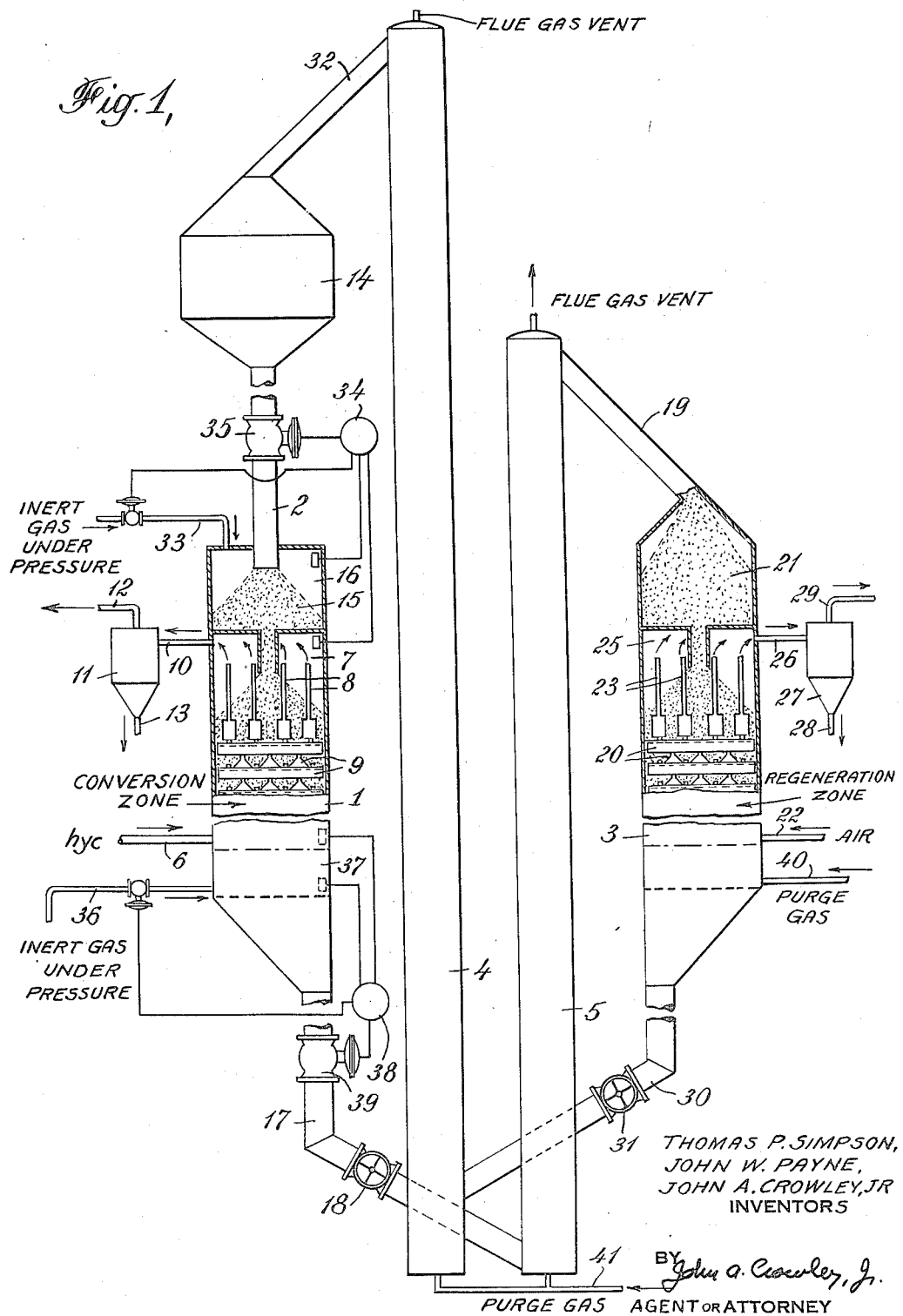

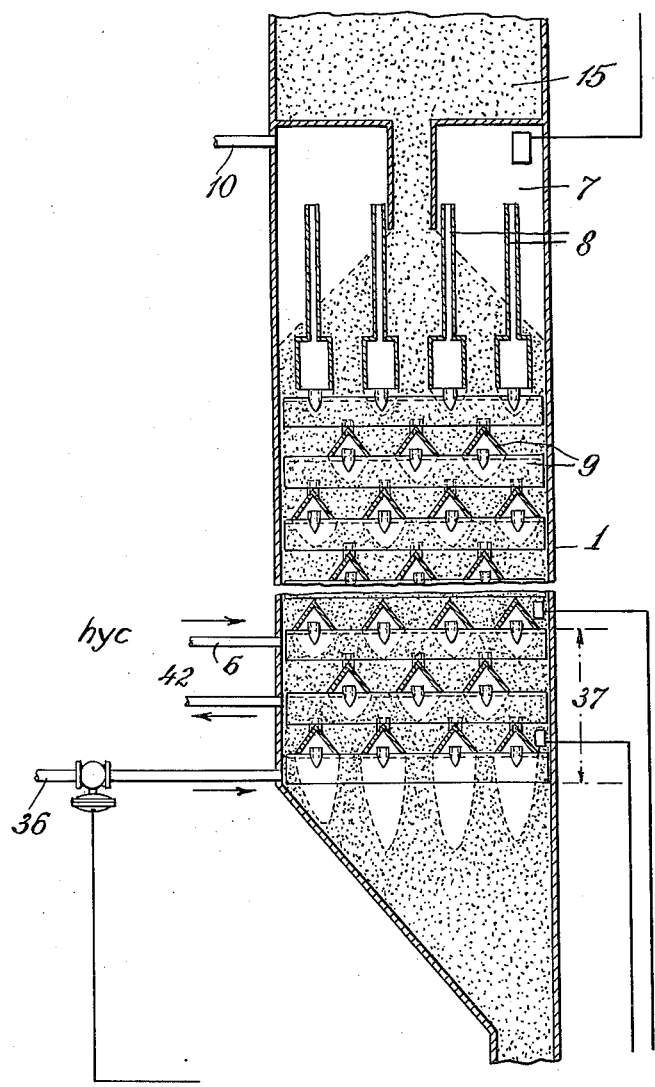

SYSTEM FOR CONDUCTING CONVERSIONS IN THE PRESENCE OF A CONTACT MASS

Thomas P. Simpson and John W. Payne, Woodbury, N. J., and John A. Crowley, Jr., New York, N. Y., assignors to Socony-Vacuum Oil Company, Incorporated, a corporation of New York Application October 4, 1946, Serial No. 701,222

7 Claims. (Cl. 196—52)

This application is a continuation in part of application Serial Number 441,316, filed in the United States Patent Office May 1, 1942, now Patent No. 2,410,309.

This invention is concerned primarily with a continuous catalytic system for cracking heavier petroleum fractions, e. g., gas oil, to gasoline in the presence of solid catalyst particles requiring periodic regeneration. However, the invention also relates more broadly to any hydrocarbon conversion reaction in the presence of such catalysts, as for example, polymerization of hydrocarbon gases, reforming naphtha, treating gasoline, etc., as well as systems in general wherein a solid particle contact material is introduced to an enclosed zone operating under pressure for contact with a gaseous material therein. It is also broadly directed to certain improvements in gas-solid contacting method and apparatus in general.

Catalytic cracking is now a well established part of the petroleum industry and the operating conditions and the catalysts therefor are rather well known, including the regeneration of the spent catalysts. Thus, the Simpson et al. Patents 2,185,930 and 2,185,931 disclosed such operations. Temperatures of around 750° F. to 975° F. and pressures between about atmospheric and 30 pounds per square inch are considered most desirable for cracking although it is realized there may be variations. Similarly, alumina-silica catalysts, either natural or synthetic, are preferred; however, other catalysts have been proposed and may be used. Likewise, it now is realized the regeneration temperature for burning off carbonaceous matter with air should be controlled between about 850° and about 1200° F. In the same manner, operating conditions and the catalysts for other hydrocarbon conversion processes are rather well known, as, for instance, in reforming naphtha, it is understood that the same catalysts may be used as are used for cracking but under somewhat different temperature conditions.

In the copending Simpson et al. application Serial No. 361,440, filed October 16, 1940, now Patent No. 2,419,507, which, in turn, is a continuation in part of Serial No. 162,541, filed September 4, 1937, now abandoned, there is disclosed specifically a continuous system for carrying out catalytic cracking wherein a conversion zone remains continuously on conversion by having the solid catalyst particles move therethrough and a regeneration zone remains continuously on regeneration by having the spent catalyst particles move therethrough. In such a system, means must be devised for introducing and withdrawing the solid catalyst particles to and from the conversion zone without substantial flow of undesired gases to and from this zone. The present invention is directed particularly to an improvement in this feature and to a unitary system of improved design which has several operating advantages.

Therefore, it is an object of the present invention to provide a novel and efficient means for flowing solid catalyst particles through a continuous hydrocarbon conversion system.

A more specific object is to provide a system for introducing and withdrawing solid catalyst particles to and from a vapor-sealed hydrocarbon conversion zone (or a catalyst regeneration zone) which system does not require vapor-sealed catalyst valves, and, therefore, which has less tendency to crush the catalyst or to have mechanical failure or to cause variations in the pressure within the zone.

Another object is to provide a continuous catalyst hydrocarbon conversion system which permits the maintaining of proper pressure balances throughout the system in a very practical manner.

Still another object is to provide a system having the above advantages which is applicable to operations in general wherein solid contact particles are introduced to a zone operating under pressure for contact with a gaseous material therein.

Another important object is the provision in a gas-solid contacting system wherein gas is contacted under pressure with a moving contact mass of a method and apparatus for supply of particle-form contact material from a supply zone under lower gaseous pressure than the contacting zone into said contacting zone without entrainment of gas from said supply zone to said contacting zone and without flow of excessive amounts of gas from said contacting zone to said supply zone.

Still another object is to provide a system having the above advantages which is applicable to to operations in general wherein solid contact particles are introduced to a zone operating under pressure for contact with a gaseous material therein.

These and other objects will be apparent from the following description of the invention. In describing our invention, for the sake of simplicity, we speak primarily of catalyst cracking and of doing same in the presence of a clay catalyst. It is to be understood, however, that the invention has a wider scope, as indicated above.

According to the preferred embodiment of our invention, clay catalyst is flowed into the top part of a continuous cracking case through an elongated clay leg which extends above the case and which has a sufficient height that the pressure of the clay head in such clay leg is greater than the pressure in the case. The clay leg empties into an accumulation of clay at the point it enters the case so that the clay feed is even and the accumulation remains substantially constant. Preferably, clay fills the case, or substantially fills the case (allowing for the natural void spaces of the clay and the displacing effect of internal case structure, if any), and hence, a substantially compact column of catalyst is maintained in the case. This column of catalyst may then form the accumulation of clay into which the clay leg feeds, or it may be in continuous clay contact with such an accumulation so that this column of clay and the clay leg comprise a continuous body of clay. Clay from the clay leg then flows into the substantially compact column of catalyst in the conversion zone of the case at the same rate at which spent catalyst is withdrawn from near the bottom of the column, thereby maintaining a column of active catalyst within the case. Spent clay is preferably withdrawn from the bottom of the case by means of a compact leg of clay which also presents sufficient resistance to the flow of gases therethrough to a comparatively small quantity. In the unitary system, the regeneration case may be operated in an analogous manner; however, since this zone may be under atmospheric pressure and since neither substantial recovery of flue gas nor substantially exclusion of air from the zone is essential, a simpler means may be employed.

In order to have the hydrocarbon vapor flow through the substantially compact column of clay catalyst particles in the conversion case at a feasible rate but not flow through the clay leg seals when the two form one continuous body of clay, there may be baffling structure or the like in the case to assist the flow of the gases therein. This baffling or gas-flow-assisting structure may take various forms and be more or less extensive, depending upon the size and shape of the particles.

Thus, in the copending Simpson et al. application Serial No. 362,882, filed October 25, 1940, now Patent No. 2,331,433, it is disclosed that where the catalyst particles in a continuous system are rather small, e. g., around 10 to 100 mesh, whereby breakage and crushing losses are lessened, baffling of compact columns of such catalyst should be used so as to provide substantially continuous gas paths through the column. Otherwise it is extremely difficult to flow the gas through the catalyst column at feasible rates and to prevent "boiling" of the clay.

Where catalysts providing larger void spaces are used, there is less resistance to the passage of vapors, and, accordingly, baffling is less advantageous.

For instance, as the particle size approaches, say 5 or 6 mesh and larger, and the particles are made sufficiently hard to properly withstand abrasion, very little, if any, baffling would be actually needed merely for getting gas through the catalyst column at a practical rate, even though it may be desirable to use same. Therefore, under such circumstances, baffling in the conversion case may be eliminated. This may be done even where the catalyst in the clay column and in the clay leg form one continuous body by having the clay leg of substantially narrower cross-section than the column of catalyst in the case so that it offers substantially more resistance to flow of gas therethrough.

In the present invention, therefore, the rule to be followed is that the column of catalyst in the conversion zone—if a column is used therein—should permit passage of gas therethrough at a feasible rate either because of particle size or assisting structure, while the clay leg should be of such form and/or of such compactness as to offer substantially more resistance to gas flow so that gas will not pass out the leg but can be drawn off independently from the top of the conversion zone.

The invention will be described further by reference to the accompanying drawings, Figure 1 of which shows a preferred embodiment of our system, while Figure 2 shows detail thereof, both in diagram form.

The system shown in the drawing comprises a conversion case 1, with a clay feed leg 2 therefor, a regeneration case 3, and catalyst elevators 4 and 5 for returning catalyst to the conversion case 1 and the regeneration case 2, respectively.

In operation hydrocarbon charge stock which has been vaporized and heated to reaction temperature in a suitable furnace (not shown) is introduced to case 1, by line 6. These vapors pass upwardly through the case under cracking conditions in contact with a baffled column of catalyst moving downwardly therethrough, thereby effecting the desired cracking. Cracked products are withdrawn from the top of the baffles 9 into space 7 through vents 8. These withdrawn vapors then pass through line 10 to cyclone separator 11 for separation of entrained catalyst particles. Vapors leaving separator 11 at 12 are passed to a suitable distillation system (not shown), while removed catalyst particles leaving separator 11 by line 13 may be discarded or returned to the system, as desired. In the distillation system the cracked products are separated in conventional manner into a cracked gasoline and a cycle stock fraction. The cycle stock fraction may be recycled, if desired, to the conversion zone for further cracking.

Fresh or regenerated catalyst contained in main hopper 14 feeds in a compact column through clay leg 2 into the accumulation of clay 15 in reactor hopper 16. The leg 2 is of sufficient height to permit free clay flow at the desired rates against the pressure in hopper 16, without the use of any clay valve, and the flow of gas through the clay leg countercurrent to the clay will be negligible, due to the enormous frictional resistance of the fine, closely-packed clay particles. An atmosphere of steam or inert gas may be maintained in the reactor hopper 16 to prevent the passage of any hydrocarbon vapors at all up through the clay leg. However, the latter feature may be omitted in hydrocarbon conversion operation and particularly in other gas-solid contacting operations by careful adherence to the improved method and apparatus which will be discussed hereinafter.

Spent clay at the bottom of reactor 1 passes in the form of a compact column of clay through leg 17 to the bottom of elevator 5. A flow control valve 18 is provided on the leg 17 but the leg is of substantial length between its upper end and the level of the valve 18. Since the clay leg 17 also presents substantially more resistance to flow than the baffled column of catalyst in case 1, there is a negligible loss of gas therethrough.

Catalyst elevator 5, as well as elevator 4, may be of any suitable type, such as bucket-type conveyor or a skip-hoist. Spent catalyst at the bottom of conveyor 5 is lifted by this conveyor to the top thereof from where it passes through clay line 19 to the regeneration case hopper 21 in the top of regeneration case 3. Spent catalyst passes from hopper 21 on down through case 3 under regeneration conditions so as to be properly regenerated by the time it reaches the bottom of the case. The regeneration is effected by air introduced by line 22 near the bottom of the case and which rises therethrough. Flue gases resulting from the regeneration process are withdrawn from the top of baffles 20 through vents 23 into space 25 from where they pass through line 26 into cyclone separator 27 for separation of any entrained catalyst. Catalyst particles leaving separator 27 through line 28 may be returned to the system or discarded. Flue gas in line 29 may be vented or used for purging in the system as later described. Any flue gas which may pass upwardly through clay line 19 is vented from the top of elevator 5.

Regenerated clay leaving the bottom of case 3 passes through clay line 30, which may contain clay flow-rate valve 31, into the bottom of elevator 4. Gases in the case 3 are prevented from passing downwardly into elevator 4, preferably by constructing clay line 30 similarly to clay leg 17 of case 1. The regenerated clay pouring into the bottom of elevator 4 is raised by this elevator into clay line 32 at the top of the elevator and passes through this line back into main hopper 14 for reuse in the system. Any flue gas carried by the catalyst into elevator 4 may be vented at the top thereof. Fresh make-up catalyst may be added to the system as needed, and fines withdrawn from the system, as required, in suitable manner.

Accordingly, it will be seen that catalyst flows through the complete cycle of the system without the necessity of vapor-sealed catalyst valves and yet in such fashion thta proper vapor seals are maintained. Moreover, a more constant pressure may be maintained in the conversion case by the present system than where catalyst is being fed into the case and removed from the case through vapor-sealed valves.

Considering again the reactor contact material feed leg 2, it will be understood that the dimensions of this leg will vary widely depending upon the particular operating conditions, vapors and contact material involved. Since it is usually desirable to maintain the supply hopper 14 at a substantially lower gaseous pressure than that in the upper section of the conversion zone, the leg 2 should be of a length corresponding to a column of contact material therein having a head greater than the gaseous pressure differential between the upper and lower ends of the leg. The length of feed leg required is dependent upon the density of the contact material involved. Broadly, the feed leg should be of a length within the range about 3 to 8 feet in length per pound per square inch pressure differential between its ends. More specifically the minimum required leg length may be estimated by the equation:

$$L(\text{minimum}) = \frac{P \times 144}{S_c} \times \frac{P/2 + 14.7}{14.7}$$

in which P is the pressure differential in pounds per square inch between the ends of the feed leg and $S_c$ is the density of the flowing compact stream of contact material in pounds per cubic feet and L minimum, is the minimum required leg length. Generally the leg 2 should be somewhat longer than the minimum required length in order to allow for sudden fluctuation in pressure in the system. The leg 2 should be of sufficient horizontal cross-sectional area to permit the flow therethrough of the maximum required rate of contact material charge to the contacting zone. In general for pipes over six inches in diameter the maximum contact material flow capacity of a leg in cubic feet per minute is roughly equal to $295A^{1.3}$ where A is the horizontal cross-sectional area of the leg in square feet. This latter expression is valid only when there is substantially no gaseous pressure differential between the ends of the feed leg. It may be said in general that for each inch of water per foot of leg gaseous pressure gradient against which the contact material flows, the capacity of the leg as estimated by the above expression is decreased by about 5%. Thus for a pressure gradient of 5" of water per foot of leg, the capacity of the leg is about 75% of that estimated by the above expression. The capacity falls off more rapidly for higher and less desirable pressure gradients. In the case of a drain leg such as leg 17, the capacity of the leg as estimated by the above expression increases by about 12% for each inch of water per foot of leg length pressure gradient in the direction of the solid flow. Here also, the flow capacity of the leg changes much more rapidly at pressure gradients above 5" of water per foot of leg.

It has been found that the provision of a feed leg which is merely long enough to insure gravity flow against pressure and of sufficient diameter to permit the required rate of catalyst charge to the contacting zone is not alone sufficient to permit satisfactory operation. It has been found that a feed leg may well meet the above requirements but yet be of such relative length to cross-sectional area dimensions as to cause material entrainment of gas from a lower pressure supply zone along with the contact material into the higher pressure contacting zone therebelow. This condition may arise particularly in cases wherein the feed leg is considerably longer than the minimum required to overcome the pressure in the contacting vessel and the linear rate of catalyst flow in the leg is high. This condition is very serious in many processes, especially where the contact material supply hopper is vented to the air and the contacting gas in the contacting zone is combustible or explosive in nature, for example hydrocarbon gases. It has been found that this condition may be avoided by proper control of the relative dimensions of the feed leg length and horizontal cross-sectional area. In general the leg length and horizontal cross-section area should be such that $$\frac{L^{(2/3)}}{A}$$

is always less than $1.6 \times 10^4 F_1$, where $$F_1 = \frac{D_e^{0.78} S^{0.60} P^{0.70}}{CVSZ^{0.20}}$$

in which L is the length of the feed leg in feet, A is its horizontal cross-sectional area in square feet, $D_e$ is the average diameter in inches of the particles of the contact material involved, S is the density in pounds per cubic foot at the average temperature, and pressure conditions in the feed leg of vapors of the composition of the vapors in the upper section of the contacting zone, Z is the viscosity in centipoise of these same vapors under the same conditions, P is the pressure differential in pounds per square inch between the ends of said feed leg, C is the rate of contact material flow through the feed leg in cubic feet per hour (measured on the basis of the flowing density of said contact material), and V is the fraction of voids in the compact stream of contact material flowing in said feed leg.

For practical operation of a continuous gas-solid contacting process it is further of utmost importance that excessive loss of contacting gas through the feed leg be prevented. It has been found that this may be accomplished provided that the relative feed leg length and horizontal cross-sectional area be made such that $$\frac{L^{(2/3)}}{A}$$

is always greater than $160 \times 10^4 F_2$ in which L is the length of the feed leg in feet, A is its horizontal cross-sectional area in square feet and $$F_2 = \frac{De^{0.78} S^{0.60} P^{0.70}}{(R+100CVS)Z^{0.20}}$$

in which De is the average diameter in inches of the contact material particles, S is the density in pounds per cubic foot at the average temperature and pressure conditions in the feed leg of vapors of the composition of the vapors in the upper section of the contacting zone, Z is the viscosity in centipoise of these same vapors under the same conditions, P is the pressure differential in pounds per square inch between the ends of the feed leg, R is the total rate of fluid contacting medium flow through the contacting zone in pounds per hour, C is the rate of contact material flow through the feed leg in cubic feet per hour (measured on the basis of the flowing density of said contact material) and V is the fraction of voids in the compact stream of contact material flowing in said feed leg. In its most preferable form the feed leg should be of such relative length to cross-sectional area dimensions that $$\frac{L^{(2/3)}}{A}$$

is less than $1.6 \times 10^4 F_1$ but greater than $160 \times 10^4 F_2$.

In the case of the drain leg from the contacting zone, it is also of considerable importance to prevent excessive flow of contacting gas through the drain leg along with the contact material to a lower pressure receiving zone such as an elevator boot section therebelow. It has been found that excessive loss of contacting gases through the drain leg may be prevented provided the relative leg lengths to horizontal cross-sectional area are such that $$\frac{L^{(2/3)}}{A}$$

is always greater than $80 \times 10^4 F_3$ where L is the length of the drain leg in feet, A is the area in square feet, and $$F_3 = \frac{De^{0.78} S^{0.60} P^{0.70}}{(R-50CVS)Z^{0.20}}$$

in which De is the average particle diameter in inches of the contact material, S is the density in pounds per cubic foot at the average temperature and pressure in said drain leg of vapors of the composition of the vapors in the lower section of the contacting zone, Z is the viscosity in centipoises of the same vapors under the same conditions, P is the pressure differential between the ends of the drain leg in pounds per square inch, R is the total rate of fluid contacting medium flow through the contacting zone in pounds per hour, C is the rate of contact material flow through the drain leg in cubic feet per hour (measured on the basis of the flowing density of said contact material in the drain leg) and V is the fraction of voids in the compact stream of contact material flowing in said drain leg.

The above equations are broad not only to hydrocarbon reactants and clay catalysts but to other gaseous contacting mediums and other particle-form contact materials. It will be apparent that all the variables upon which the factors $F_1$ and $F_2$ and $F_3$ depend become immediately fixed and known, once any particular operation application of the invention is chosen. Thus, one may without the need for outside experimentation build the feed and drain legs disclosed by this application for any set of operation conditions by means of equations and information given hereinabove.

While the method and apparatus of this invention permits the conducting of many gas-solid contacting operations without the requirement of inert gas or steam seals at either end of the contacting zone or vessel, still, if desired, such blankets of inert gas at the top and bottom of the conversion or contacting case may be used in conjunction with feed and drain legs of the type described hereinabove. This inert gas may be the flue gas withdrawn from regeneration case 3 and leaving separator 27 at 29. However, any other inert gas may be used, such as, for example, steam. This gas is passed through line 33 into reactor hopper 16 so as to create a slightly higher pressure therein than exists in the upper hydrocarbon vapor space 7 of case 1, whereby it will be impossible for hydrocarbon vapors to enter hopper 16. On the other hand, only a small amount of the inert gas will go into the vapor space 7 of case 1, and out with the cracked products since the pressure differential is very small and there is a considerable resistance offered to such gas flow by the clay. A differential pressure controller 34 also is provided so that it will automatically close valve 35 in clay leg 2 if the positive differential pressure in the reactor hopper 16 falls below a fixed minimum.

Similarly, inert gas may be fed through line 36 into purge section 37 at the bottom of case 1, so as to maintain a slightly higher pressure therein than exists in the case at the hydrocarbon vapor inlet 6. Differential pressure controller 38 is devised to automatically shut valve 39 in clay leg 17 if this positive pressure differential falls below a certain minimum. Thus, it is to be noted that the inert gas at the bottom of case 1, not only serves to blanket the hydrocarbon vapors from the clay withdrawal leg but also serves to effect purging of the spent catalyst of hydrocarbon material before it passes to the regeneration case 3. Purging of the regenerated catalyst of regeneration gases in case 3, if desired, before returning such catalyst to case 1, may be effected in a similar manner by introducing purge gas through line 40. In both of these purging operations, as shown, substantialy all of the purge gases will pass upwardly through the cases and out with the gaseous products. If desired, the purge gases can be collected separately by inserting suitable collecting headers below points 6 or 22, such as those shown in Figure 2, attached to exit pipes 42 and 43.

As another added precaution, inert purge gas, such as, for example, flue gas from cyclone separator 27, is passed through line 41 into the bottom of elevators 4 and 5, the gas being vented at the top of the elevators. This feature provides a safety seal between all parts of the clay transfer system. Therefore, it will be seen that purging may be effected in the bottom part of both cases and in both elevators. On the other hand, it may be eliminated at all these points or it may be practiced only at such points as are desirable. For example, purging might be conducted only in the elevators. Further, purging of hydrocarbon material from the spent catalyst passing from the conversion case to the regeneration case is more desirable than purging of the regenerated catalyst. Accordingly, purging of spent catalyst only may be practiced. Also, in this connection, it has been found that when steam is used for the seal gas in chamber 16, disturbances may occur in the operation of the clay leg. In certain cases, the disturbance may be severe enough to actually interrupt the flow of clay through leg 2 into hopper 16. This effect is apparently due to the adsorption of steam by the clay in clay leg 2. If the clay is thoroughly saturated with steam prior to entering clay leg 2 the disturbance through the use of steam in hopper 16 does not occur. The clay may be saturated with steam prior to entering clay leg 2 by introducing steam into hopper 14, elevator 4 or purge section 40. Figure 2 shows the detailed internal arrangement at the bottom of the reactor, which is the same in reactor and regenerator.

It is to be understood that in the present unitary system, the catalyst should be passed substantially directly from each case to the other case so that the catalyst is still in a heated condition when it reaches the case to which it is being sent. In this way, a substantial economy in operation is realized.

As noted hereinabove, conditions and catalysts for catalytic cracking and other hydrocarbon reactions are known. Moreover, conditions for regenerating the catalysts are known. Such operations are shown, for instance, in the various Simpson et al. patents and applications mentioned hereinabove. Furthermore, it is to be understood any continuous catalyst regeneration process may be used in the present unitary system. However, it is preferred to use a process of the type disclosed in the Simpson et al. application, Serial No. 362,882, now Patent No. 2,331,433.

We claim:

1. In a process for continuously catalytically converting fluid hydrocarbons in the presence of particle-form solid catalyst wherein the catalyst is moved downwardly through a conversion zone operating under pressure as a substantially compact column of particles and the fluid hydrocarbons are passed under conversion conditions into contact with said catalyst in said conversion zone and wherein active catalyst particles are introduced to said zone near the top thereof in order to maintain said column of catalyst in said conversion zone the improvement which comprises: introducing the active catalyst particles into said conversion zone from a substantially compact stream of catalyst particles maintained above said conversion zone which stream forms a continuous body of catalyst with said column and which is of such cross-sectional area and vertical length above said zone as to insure gravity flow of catalyst at the required rate into said conversion zone against the gaseous pressure therein, said compact stream being further of such cross-sectional area and length that the quotient of the two-thirds power of the stream length in feet divided by the cross-sectional area of said stream in square feet is less than $$1.6 \times 10^4 \frac{De^{0.78} S^{0.60} P^{0.70}}{CVSZ^{0.2}}$$

in which L is the stream length in feet, A is the stream horizontal area in square feet, De is the average diameter of the contact material particles in inches, S is the density in pounds per cubic foot of gas of composition of the gaseous material in the upper section of said conversion zone at the average pressure and temperature in said stream, Z is the viscosity in centipoises of said gaseous material under the same conditions, P is the pressure differential between the lower end and upper end of said stream in pounds per square inch, C is the rate of contact material flow in said stream in cubic feet per hour, V is the fraction of voids in the flowing contact material in said stream, whereby the entrainment of gas by the catalyst through said stream into said conversion zone is precluded; supplying catalyst to the upper end of said stream and maintaining the gaseous pressure adjacent the upper end of said stream substantially below the gaseous pressure in said conversion zone.

2. In a gas-solid contacting process for contacting a gas under pressure with particle-form solid contact material in a confined contacting zone the improved method for supply of contact material to said zone from a zone of lower gaseous pressure without the use of gas tight valves and feed locks while preventing passage of gas along with said contact material from said lower pressure zone to said contacting zone which method comprises: passing said contact material from said lower pressure zone as a substantially compact, vertical, confined, continuous stream of particles gravitating downwardly from said lower pressure zone to said contacting zone therebelow, said confined stream being of a vertical length corresponding to a column of contact material in said confined stream having a greater head of contact material than the gaseous pressure differential between the ends of said stream and of sufficient cross-sectional area to insure the required rate of flow of contact material into said conversion zone and said stream being further of such relative length and cross-sectional area that $$\frac{L^{(2/3)}}{A}$$

is always less than $$1.6 \times 10^4 \frac{De^{0.78} S^{0.60} P^{0.70}}{CVSZ^{0.2}}$$

in which L is the stream length in feet, A is the stream horizontal area in square feet, De is the average diameter of the contact material particles in inches, S is the density in pounds per cubic foot of gas of composition of the contacting gas in said contacting zone adjacent the lower end of said stream at the average pressure in said stream, Z is the viscosity of said gas under the same conditions in centipoises, P is the pressure differential between the lower end and upper end of said stream in pounds per square inch gauge, C is the rate of contact material flow in said stream in cubic feet per hour, V is the fraction of voids in the flowing contact material in said stream; whereby entrainment of gas from said lower pressure zone into said contacting zone is precluded.

3. In a process for conversion of fluid reactants above atmospheric pressure in the presence of a moving mass of particle-form contact material, that method for supply of contact material from a supply body thereof positioned above said conversion zone and maintained under a lower pressure to said conversion zone while avoiding entrainment of gas from above said body by the contact material flowing to said conversion zone which method comprises: maintaining a substantially compact confined, vertical stream of gravitating contact material particles between said supply body and said conversion zone, said stream being of a length within the range 3 to 8 feet per pound of gaseous pressure differential between its ends and being of sufficient cross-sectional area to permit the required rate of contact material therethrough into said conversion zone and the length and cross-sectional area of said stream being of such relative size that $$\frac{L^{(2/3)}}{A}$$

is less than $$1.6 \times 10^4 \frac{De^{0.78} S^{0.6} P^{0.7}}{CV S Z^{0.2}}$$

where L is the length of said stream in feet, A is the area thereof in square feet, De is the average diameter of the contact material particles in inches, S is the density in pounds per cubic foot of gas of the composition of gas adjacent the upper end of said conversion zone at the average pressure and temperature in said stream, Z is the viscosity in centipoises of said gas under the same conditions, P is the average pressure differential in pounds per square inch between the ends of said last named stream, C is the rate of contact material flow in said stream in cubic feet per hour and V is the fraction of void space in the flowing contact material stream; whereby entrainment of gas in said stream from said supply body to said conversion zone is avoided.

4. In a process for introducing solid particle contact material to an enclosed zone operating under gaseous pressure, the improvement which comprises: introducing the contact material to the zone from an elongated substantially compact, confined stream of downwardly flowing particles extending upwardly from said zone to a lower pressure zone while maintaining a relationship between the lateral and longitudinal dimensions of said stream and the operating conditions wherein $$\frac{L^{(2/3)}}{A}$$

is always less than $$1.6 \times 10^4 \frac{De^{0.78} S^{0.60} P^{0.70}}{CV S Z^{0.2}}$$

in which L is the stream length in feet, A is the stream horizontal area in square feet, De is the average diameter of the contact material particles in inches, S is the density in pounds per cubic foot of gas of composition of the gas in said contacting zone adjacent the lower end of said stream at the average pressure in said stream, Z is the viscosity of said gas under the same conditions in centipoises, P is the pressure differential between the lower end and upper end of said stream in pounds per square inch gauge, C is the rate of contact material flow in said stream in cubic feet per hour, V is the fraction of voids in the flowing contact material in said stream; whereby the desired amount of contact material from said stream flows by gravity through said stream into said zone under pressure against the pressure therein without substantial entrainment by said contact material of gas from said lower pressure zone into said zone under pressure.

5. In a process for continuously catalytically converting fluid hydrocarbons in the presence of particle-form solid catalyst wherein the catalyst is moved downwardly through a conversion zone operating under pressure as a substantially compact column of particles and the fluid hydrocarbons are passed under conversion conditions into contact with said catalyst in said conversion zone and wherein active catalyst particles are introduced to said zone near the top thereof in order to maintain said column of catalyst in said conversion zone the improvement which comprises: gravitating the active catalyst particles at the desired rate downwardly as a substantially compact, confined, elongated, vertical stream of particles into said conversion zone against the gaseous pressure therein; supplying catalyst to the upper end of said stream at a pressure substantially below the gaseous pressure in said conversion zone; and precluding entrainment of gas in said stream into said conversion zone and also excessive loss of gas from said conversion zone through said stream by maintaining the operation within the limits required by the following relationships:

$$\frac{L^{(2/3)}}{A}$$

is less than $$1.6 \times 10^4 \frac{De^{0.78} S^{0.6} P^{0.7}}{CV S Z^{0.2}}$$

and $$\frac{L^{(2/3)}}{A}$$

is greater than $$160 \times 10^4 \frac{De^{0.78} S^{0.6} P^{0.7}}{(R + 100 CV S) Z^{0.2}}$$

in which L is the length of said stream in feet, A is the cross-sectional area of stream in square feet, De is the average diameter of the catalyst particles in inches, S is the density in pounds per cubic foot of vapors of composition of the vapors in the upper section of said conversion zone at the average pressure and temperature in said stream, Z is the viscosity of said vapors under the same conditions in centipoises, P is the pressure differential in pounds per square inch gauge between the ends of said stream, R is the rate of vapor flow through the conversion zone in pounds per hour, C is the rate of catalyst flow in said stream in cubic feet per hour, V is the fraction of void space in the flowing catalyst stream.

6. A process for conversion of fluid hydrocarbons in the presence of a moving mass of particle-form solid contact material which comprises: maintaining a substantially compact column of particle-form contact material within a confined conversion zone, passing fluid hydrocarbons under suitable conversion conditions of temperature and pressure through said column to effect their conversion, withdrawing used contact material from the lower section of said conversion zone through a substantially compact, downwardly extending stream of downwardly flowing particles to a zone of lower pressure, said stream being of such relative length between the ends and horizontal cross-sectional area that $$\frac{L^{(2/3)}}{A}$$

is greater than $$80 \times 10^4 \frac{De^{0.78} \times S^{0.6} \times P^{0.70}}{(R - 50CVS)Z^{0.2}}$$

in which L is the length of said stream in feet, A is the area thereof in square feet, De is the average diameter of the contact material particles, S is the density in pounds per cubic foot at the average temperature and pressure in said stream, of gaseous material of the composition of the gaseous material at that level where said stream joins the column of contact material in the conversion zone, Z is the viscosity in centipoises of said gaseous material under the same conditions, P is the pressure differential in pounds per square inch between the ends of said stream, R is the rate of vapor flow through said conversion zone in pounds per hour, and C is the rate of contact material flow in said stream in cubic feet per hour whereby excessive loss of gas from said conversion zone through said stream is precluded; supplying fresh contact material from a lower pressure supply zone to the upper section of said conversion zone as a substantially compact, confined stream extending upwardly from said conversion zone to said lower pressure supply zone, said stream being of such vertical length and horizontal cross-sectional area as to insure the required rate of contact material flow from said last named stream into said conversion zone against the pressure therein, and said stream being of such relative length and horizontal cross-sectional area that $$\frac{L^{(2/3)}}{A}$$

is less than $$1.6 \times 10^4 \frac{De^{0.78} S^{0.6} P^{0.7}}{CVSZ^{0.2}}$$

and greater than $$160 \times 10^4 \frac{De^{0.78} S^{0.6} P^{0.7}}{(R + 100CVS)Z^{0.2}}$$

in which L is the length of said last named stream in feet and A is the horizontal cross-sectional area thereof in square feet, De is the average diameter of the contact material particles in inches, S is the density in pounds per cubic foot of gas of the composition of the gas adjacent the upper end of said conversion zone at the average pressure and temperature in said stream, Z is the viscosity in centipoises of said gas under the same conditions, P is the average pressure differential in pounds per square inch between the ends of said last named stream, R is the rate of gas flow through the conversion zone in pounds per hour, C is the rate of contact material flow in said stream in cubic feet per hour and V is the fraction of void space in the flowing contact material stream; whereby entrainment of gas from said supply zone into said conversion zone and also excessive loss of gas from said conversion zone to said supply zone are precluded.

7. A process for conversion of fluid hydrocarbons in the presence of a moving mass of particle-form solid contact material which comprises: maintaining a substantially compact column of particle-form contact material within a confined conversion zone, passing fluid hydrocarbons under suitable conversion conditions of temperature and superatmospheric gaseous pressure through said column to effect their conversion, withdrawing used contact material from the lower section of said conversion zone, replenishing said column at its upper end by gravitating particle form contact material at the required rate downwardly as a substantially compact, confined, elongated, vertical stream of particles into the upper section of said conversion zone against the gaseous pressure therein and flowing the contact material onto said column, maintaining an accumulation of contact material vented to the atmospheric air at the upper end of said compact stream, and supplying contact material to said accumulation and precluding excessive entrainment of air in said compact stream from said accumulation into said conversion zone by maintaining the operation within the range required when $$\frac{L^{(2/3)}}{A}$$

is always less than $$1.6 \times 10^4 \frac{De^{0.78} S^{0.60} P^{0.70}}{CVSZ^{0.2}}$$

in which L is the stream length in feet, A is the stream horizontal cross-sectional area in square feet and is sufficiently great to insure the desired amount of contact material flow in accordance with the relationship, contact material flow capacity in cubic feet per minute=$295A^{1.3}$ less 5 percent capacity for each one inch of water per vertical foot of stream pressure gradient in the stream, De is the average diameter of the contact material particles in inches, S is the density in pounds per cubic foot of gas of composition of the gas in the upper section of said conversion zone at average pressure and temperature in said stream, Z is the viscosity in centipoises of said gas under the same conditions, P is the pressure differential in pounds per square inch between the ends of said stream, C is the rate of contact material flow in said stream in cubic feet per hour and V is the fraction of void space in said gravitating contact material stream.

THOMAS P. SIMPSON.
JOHN W. PAYNE.
JOHN A. CROWLEY, Jr.

REFERENCES CITED

The following references are of record in the file of this patent:

UNITED STATES PATENTS

| Number | Name | Date |
|---|---|---|
| 2,314,316 | Schlesman | Mar. 16, 1943 |
| 2,335,488 | Conrad | Nov. 30, 1943 |
| 2,348,156 | Sheppard | May 2, 1944 |
| 2,351,214 | Kaufmann et al. | June 13, 1944 |
| 2,391,434 | McAfee | Dec. 25, 1945 |
| 2,414,373 | Gerhold | Jan. 14, 1947 |
| 2,414,852 | Burnside | Jan. 28, 1947 |
| 2,448,553 | Schutte et al. | Sept. 7, 1948 |

FOREIGN PATENTS

| Number | Country | Date |
|---|---|---|
| 618,502 | Germany | Sept. 10, 1935 |